United States Patent
Goldsmith et al.

(10) Patent No.: US 9,736,703 B2
(45) Date of Patent: Aug. 15, 2017

(54) INTERFERENCE MANAGEMENT AND NETWORK PERFORMANCE OPTIMIZATION IN DENSE WIFI NETWORKS

(71) Applicant: wildfire.exchange, inc., San Francisco, CA (US)

(72) Inventors: Andrea Goldsmith, Menlo Park, CA (US); Vikram Chandrasekhar, Mountain View, CA (US); Ritesh K. Madan, Jersey City, NJ (US); Santhosh Krishna, Sunnyvale, CA (US)

(73) Assignee: Plume Design, Inc., Palo Alto, CA (US)

( * ) Notice: Subject to any disclaimer, the term of this patent is extended or adjusted under 35 U.S.C. 154(b) by 0 days.

(21) Appl. No.: 13/857,096

(22) Filed: Apr. 4, 2013

(65) Prior Publication Data

US 2013/0272285 A1    Oct. 17, 2013

Related U.S. Application Data

(60) Provisional application No. 61/621,316, filed on Apr. 6, 2012, provisional application No. 61/698,426, filed on Sep. 7, 2012.

(51) Int. Cl.
*H04W 24/02* (2009.01)
*H04W 84/12* (2009.01)

(52) U.S. Cl.
CPC ............ *H04W 24/02* (2013.01); *H04W 84/12* (2013.01)

(58) Field of Classification Search
CPC ..... H04W 72/08; H04W 84/12; H04W 88/12; H04W 88/18

(Continued)

(56) References Cited

U.S. PATENT DOCUMENTS 7,315,533 B2    1/2008 Theobold et al.
7,414,978 B2    8/2008 Lun et al.
(Continued)

FOREIGN PATENT DOCUMENTS

WO    2012016187    2/2012
WO    2013043869    3/2013

OTHER PUBLICATIONS

Akhshabi et al., "An Experimental Evaluation of Rate-Adaptation Algorithms in Adaptive Streaming over HTTP", MMSys'11, Feb. 23-25, 2011, San Jose, CA.

(Continued)

*Primary Examiner* — Ricky Ngo
*Assistant Examiner* — Stephen Steiner
(74) *Attorney, Agent, or Firm* — Clements Bernard Walker PLLC; Lawrence A. Baratta, Jr.; Christopher L. Bernard

(57) ABSTRACT

A method of managing Wi-Fi access points using a Wi-Fi network manager is disclosed. Measurement data is received from a plurality of Wi-Fi access points via a control interface. Optimized adjustments to one or more Wi-Fi parameters associated with one or more of the plurality of access points are searched based at least in part on a set of network optimization goals and the measurement data received from the plurality of access points. At least some of the optimized adjustments to the one or more Wi-Fi parameters are transmitted to the one or more of the plurality of access points using the control interface.

41 Claims, 11 Drawing Sheets

(58) Field of Classification Search
USPC ............... 370/338, 328, 329, 332–334, 465
See application file for complete search history.

(56) References Cited

U.S. PATENT DOCUMENTS

| | | | |
|---|---|---|---|
| 7,953,403 | B2 | 5/2011 | Nientiedt |
| 8,681,810 | B2 | 3/2014 | Nandagopalan et al. |
| 8,750,894 | B1 | 6/2014 | Stogaitis et al. |
| 8,798,021 | B2 | 8/2014 | Mangalvedhe et al. |
| 9,031,591 | B2 | 5/2015 | Ma et al. |
| 9,060,279 | B2 | 6/2015 | Ganu et al. |
| 9,060,289 | B2 | 6/2015 | Chandrasekhar et al. |
| 9,066,251 | B2 | 6/2015 | Madan et al. |
| 9,185,619 | B2 | 11/2015 | Meshkati et al. |
| 2006/0258395 | A1 | 11/2006 | Cave et al. |
| 2007/0149172 | A1 | 6/2007 | Dickinson et al. |
| 2007/0242621 | A1* | 10/2007 | Nandagopalan et al. .... 370/254 |
| 2008/0090575 | A1 | 4/2008 | Barak et al. |
| 2009/0257380 | A1 | 10/2009 | Meier |
| 2009/0279427 | A1* | 11/2009 | Ji et al. .................. 370/230 |
| 2009/0316585 | A1 | 12/2009 | Srinivasan et al. |
| 2009/0323632 | A1* | 12/2009 | Nix ........................ 370/331 |
| 2010/0029282 | A1 | 2/2010 | Stamoulis et al. |
| 2010/0167777 | A1 | 7/2010 | Raghotaman et al. |
| 2011/0039554 | A1* | 2/2011 | Bims ...................... 455/434 |
| 2011/0151886 | A1 | 6/2011 | Grayson et al. |
| 2012/0002567 | A1 | 1/2012 | Sun et al. |
| 2012/0009909 | A1 | 1/2012 | Lau |
| 2012/0087268 | A1 | 4/2012 | Savoor et al. |
| 2012/0088482 | A1 | 4/2012 | Pazhyannur et al. |
| 2012/0122503 | A1 | 5/2012 | Ma et al. |
| 2012/0257585 | A1* | 10/2012 | Sydor et al. .................. 370/329 |

OTHER PUBLICATIONS

Chambelin et al., "Evaluation of neighbors impact on channel allocation for dense environment and Video use cases", Jan. 17, 2011.
"Cisco Visual Networking Index:Global Mobile Data Traffic Forecast Update, 2012-2017", Cisco White Paper, Feb. 6, 2013.
Donald C. Cox, "Wireless Network Access for Personal Communications", IEEE Communication Magazine, Dec. 1992, pp. 96-115.
Neil Hughes, "iPhone 4 keynote plagued by high-tech Wi-Fi meltdown", Jun. 7, 2010, http://www.appleinsider.com/articles/10/06/07/iphone_4_keynote_plagued_by_high_tech_wi_fi_meltdown/.
Jamieson et al., "Understanding the Real-World Performance of Carrier Sense", SIGCOMM'05 Workshops, Aug. 22-26, 2005, Philadelphia, PA.
Kaynia et al., "Improving the Performance of Wireless Ad Hoc Networks Through MAC Layer Design", IEEE Transcations on Wireless Communications, vol. 10, No. 1, Jan. 2011.
Zheng et al., "Diversity and Multiplexing: A Fundamental Tradeoff in Multiple Antenna Channels", IEEE Transactions on Information Theory, vol. 1, No. 8, Aug. 2002.

* cited by examiner

US 9,736,703 B2

INTERFERENCE MANAGEMENT AND NETWORK PERFORMANCE OPTIMIZATION IN DENSE WIFI NETWORKS

CROSS REFERENCE TO OTHER APPLICATIONS

This application claims priority to U.S. Provisional Patent Application No. 61/621,316 entitled INTERFERENCE MANAGEMENT AND NETWORK PERFORMANCE OPTIMIZATION IN DENSE WIFI NETWORKS VIA CLOUD-BASED SON SOFTWARE filed Apr. 6, 2012 and claims priority to U.S. Provisional Patent Application No. 61/698,426 entitled DYNAMIC CHANNEL SELECTION IN WI-FI NETWORKS filed Sep. 7, 2012 which are incorporated herein by reference for all purposes.

BACKGROUND OF THE INVENTION

Wi-Fi networks are increasingly used for high-speed wireless connectivity in the home, office, and in public hotspots. Wi-Fi networks are designed based on the family of IEEE 802.11 Wi-Fi standards, including the early 802.11a/b/g standards, the current 802.11n standard, and the next-generation 802.11ac standard, which provides for peak data rates exceeding 1 Gigabits per second (Gbps). These standards have been designed to target access points (APs) with relatively small coverage areas and low-density deployments. In dense deployments, the interference between the APs can be severe, and the Wi-Fi standards lack sophisticated mechanisms to mitigate the interference. As a consequence, in dense deployments current Wi-Fi systems may exhibit poor spectrum reuse and significant contention among APs and clients, resulting in low throughput and poor end-user experience.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
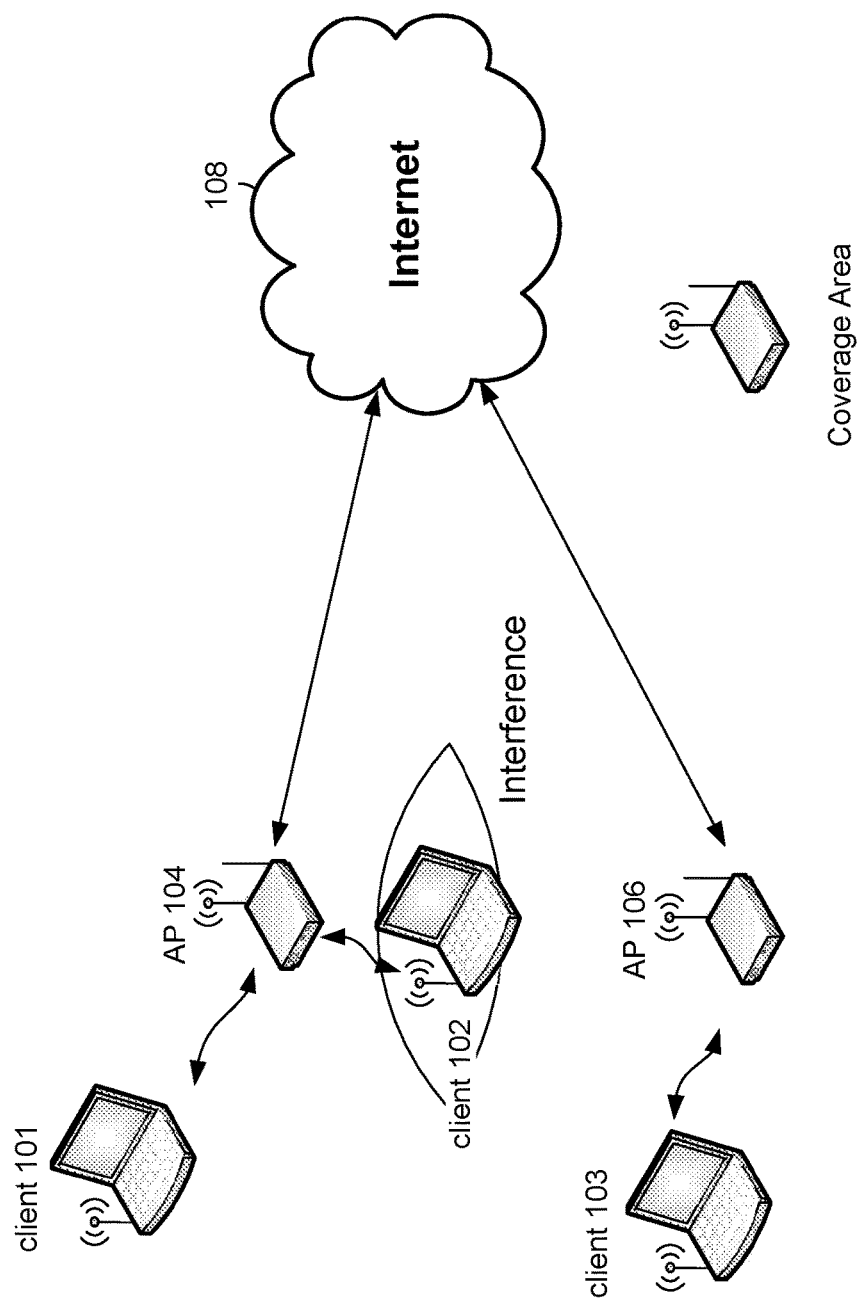
FIG. 1 illustrates a Wi-Fi network, in which a Wi-Fi-enabled client (101, 102, or 103) may connect to any authorized AP (104 or 106) when the client is within the AP's coverage area.

Wi-Fi networks are formed using one or more Wi-Fi APs, which can be deployed in homes, apartments, office buildings, and as outdoor hotspots. FIG. 1 illustrates a Wi-Fi network, in which a Wi-Fi-enabled client (101, 102, or 103) may connect to any authorized AP (104 or 106) when the client is within the AP's coverage area. Once a client is within the coverage area of a particular AP, the signal received by the client generally has a signal strength above the level required for connectivity to that AP. However, clients close to the AP typically receive stronger AP signals than clients farther away from the AP, and enjoy superior performance commensurate with the greater signal strength. APs are connected to the backbone Internet 108, with traffic routed to and from their clients via standard Internet protocols. When a client is within the coverage areas of multiple APs, the AP for the Wi-Fi connection is typically selected based on static client preferences (e.g., a preferred service set ID or SSID) or the best signal strength. For example, client 102 in FIG. 1 is within the coverage areas of two APs (AP 104 and AP 106), but client 102 may connect to AP 104 based on its preferred SSID. Wi-Fi APs operate in both the 2.4 GHz and 5 GHz spectral bands, with channel bandwidths of 20 MHz, 40 MHz, 80 MHz or 160 MHz, depending on the particular Wi-Fi standard used.

One way to reduce interference experienced by the clients in a Wi-Fi network is via channel allocation. FIG. 1 illustrates that clients connected to a particular AP may experience interference caused by other APs within the Wi-Fi network. The wireless channels in a Wi-Fi network are shared across all APs and their clients. When a given channel is used simultaneously by different APs with overlapping coverage areas, the APs create interference to each other's clients, as shown in FIG. 1. The amount of this interference depends on many factors, including the propagation conditions, the carrier frequency, and the distance between the interfering AP and the client. The channel allocation mechanism in 802.11 attempts to avoid such interference by assigning different channels to APs within close proximity to each other; this channel assignment may be done manually or based on local measurements. With this orthogonal frequency reuse, the APs use different frequencies and inter-AP interference is minimized. While this channel allocation works well to avoid interference in low-density AP deployments, in dense deployments there are not enough channels for this method to be viable. For example, only three non-overlapping channels are available in the 2.4 GHz band, making it difficult, and at times impossible, for APs with overlapping coverage areas operating in this band to each be assigned a unique channel.

To mitigate co-channel interference between APs relatively close to each other that are operating on the same channel, a second interference mitigation mechanism—carrier sense multiple access with collision avoidance (CSMA/CA)—is used. CSMA/CA avoids simultaneous transmissions by two APs on the same channel by staggering the two APs' transmissions in time. Prior to transmitting a frame, an AP monitors the wireless channel for other Wi-Fi transmissions with received power exceeding a given carrier sense threshold (CST). The CST defines a carrier sense radius around each transmitting device: any listening device within this radius will detect interference above the CST. The carrier sense radius as a function of azimuthal angle traces out a circle in ideal free-space propagation. In more typical operating environments, the radius as a function of azimuthal angle will have an irregular shape, due to the different shadowing and multipath experienced at different client locations. A random back-off timer based mechanism ensures that listening devices that detect the channel as occupied will not all simultaneously attempt to transmit as soon as the channel becomes unoccupied.

Figure 2:
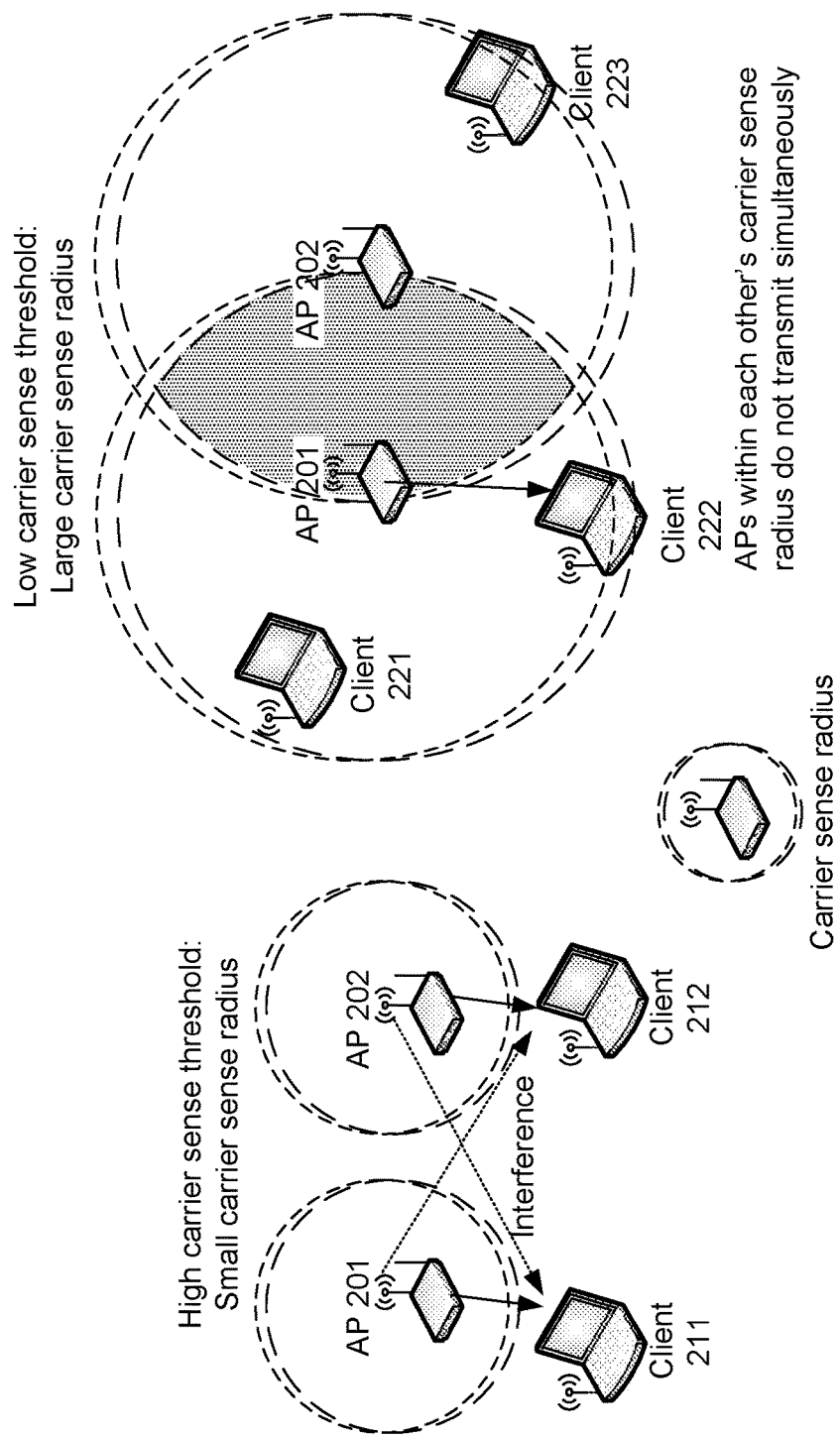
FIG. 2A illustrates that when the carrier sense threshold (CST) is high, the carrier sense radius is small.
FIG. 2B illustrates that when the CST is low, the carrier sense radius is large.

Carrier sensing generally works well in low density deployments of APs, where there are sufficient channels to avoid interference between APs, and hence aggressive frequency reuse is not needed. However, in dense deployments, with neighboring APs using the same channel, carrier sensing induces a tradeoff between aggressive frequency reuse and higher levels of interference, as illustrated in FIGS. 2A and 2B. In FIG. 2A, when the CST is high, the carrier sense radius is small. Hence AP 201 and AP 202 will transmit simultaneously, causing interference to the other AP's client. If this interference does not preclude successful packet reception, then throughput is high; if the interference is sufficiently high so as to cause packet errors, then these packets need to be retransmitted, thereby reducing throughput and increasing delay. In FIG. 2B, when the CST is low, the carrier sense radius is large. This will preclude AP 201 and AP 202 from transmitting simultaneously. If both APs have data to transmit, one will back off, thereby reducing its throughput and increasing delay.

Current Wi-Fi networks use a static CST that can be AP-specific. Selecting static CST rarely optimizes network performance, since whether or not two neighboring APs A and B transmit simultaneously depends on whether the power received from AP A at AP B (and vice versa) is below threshold. This is not the best criterion to use: in particular, packet errors are caused not by the interference between neighboring APs, but are caused by the interference between a given AP and the client associated with the neighboring AP. As shown in FIG. 2B, with a low CST, AP 201 and AP 202 fall within each other's carrier sense radius and hence will never transmit simultaneously. However, since client 221 is far from AP 202, and client 223 is far from AP 201, a transmission from AP 201 to client 221 could occur simultaneously with a transmission from AP 202 to client 223 with minimal interference between them. Fundamentally, whether AP 202 should transmit when AP 201 is transmitting should depend on how that interference impacts the signal received by AP 201's client, i.e. it should depend on the signal-to-interference-plus-noise (SINR) at AP 201's client. In addition to adapting to SINR, CSTs should also adapt to the AP density, as more APs are added to the network, as well as adapt to the client data requirements and changing propagation conditions of APs sharing the same channel. Setting the threshold adaptively can both increase throughput and reduce packet error probability.

Figure 3:
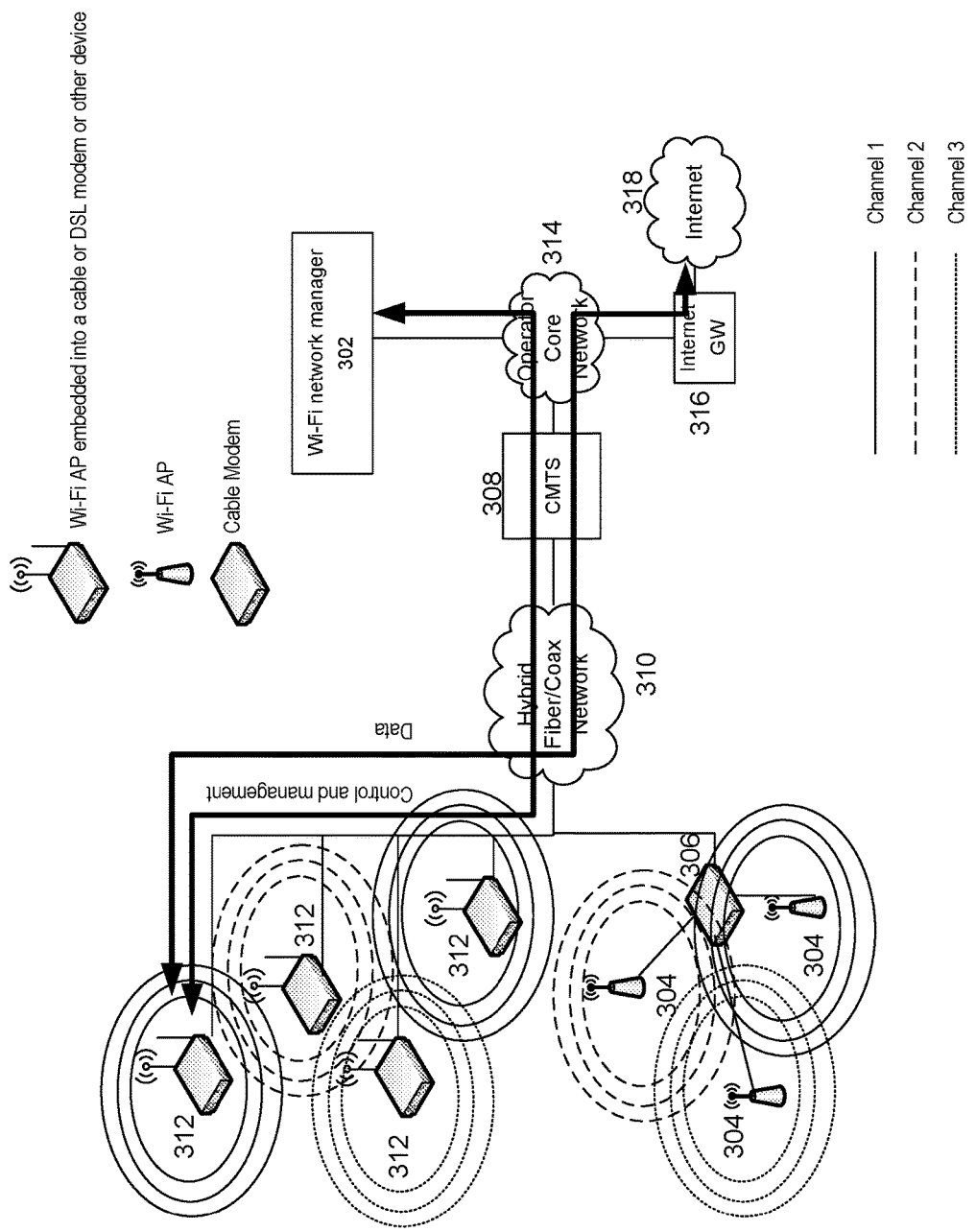
FIG. 3 illustrates an embodiment of a Wi-Fi-network manager for automatically and dynamically configuring and updating Wi-Fi AP parameters in one or more Wi-Fi networks to optimize the overall network performance of the one or more Wi-Fi networks.

FIG. 3 illustrates an embodiment of a Wi-Fi-network manager for automatically and dynamically configuring and updating Wi-Fi AP parameters in one or more Wi-Fi networks to optimize the overall network performance of the one or more Wi-Fi networks. In some embodiments, Wi-Fi network manager 302 connects to the APs and provides service to the APs as a server. In some embodiments, Wi-Fi network manager 302 manages tens of thousands (or more) of APs within the one or more Wi-Fi networks.

FIG. 3 illustrates one exemplary embodiment in which the APs are connected to Wi-Fi network manager 302 and the Internet 318 using cable modems. Note that FIG. 3 is provided as an illustrative example only. Therefore, the present application is not limited to this specific example. For example, the APs managed by Wi-Fi network manager 302 may be connected to Wi-Fi network manager 302 using network technologies other than cable modem technologies, including digital subscriber line (DSL) technologies and other Internet technologies.

As shown in FIG. 3, some of the APs managed by Wi-Fi network manager 302 may be standalone Wi-Fi APs 304. Alternatively, some of the Wi-Fi APs may be embedded into other devices, such as cable modems, DSL modems, and the like. Standalone Wi-Fi APs 304 may be connected to a cable modem 306, and cable modem 306 may be connected to a cable modem termination system (CMTS) 308 via a hybrid fiber-coaxial (HFC) network 310. CMTS 308 may be further connected to Wi-Fi network manager 302 via an operator core network 314. Data packets that are sent from CMTS 308 to the Internet 318 are routed through an Internet Gateway 316. Some APs (312) managed by Wi-Fi network manager 302 may be integrated units, each integrating a cable modem and a Wi-Fi AP as a single unit. Integrated units 312 may be connected to CMTS 308 via HFC network 310.

In some embodiments, a software agent is installed on the APs. For example, a piece of software may be installed on an AP by an end-user or a network administrator. In another example, an application may be downloaded from a website, and the application acts as an agent between the AP and Wi-Fi network manager 302. Wi-Fi network manager 302 may manage and configure the parameters of an AP using different protocols, including Simple Network Management Protocol (SNMP), Control And Provisioning of Wireless Access Points (CAPWAP), Technical Report 069/181 (TR-069/TR-181), Command-Line Interface (CLI), Extensible Markup Language (XML), and the like.

Figure 4:
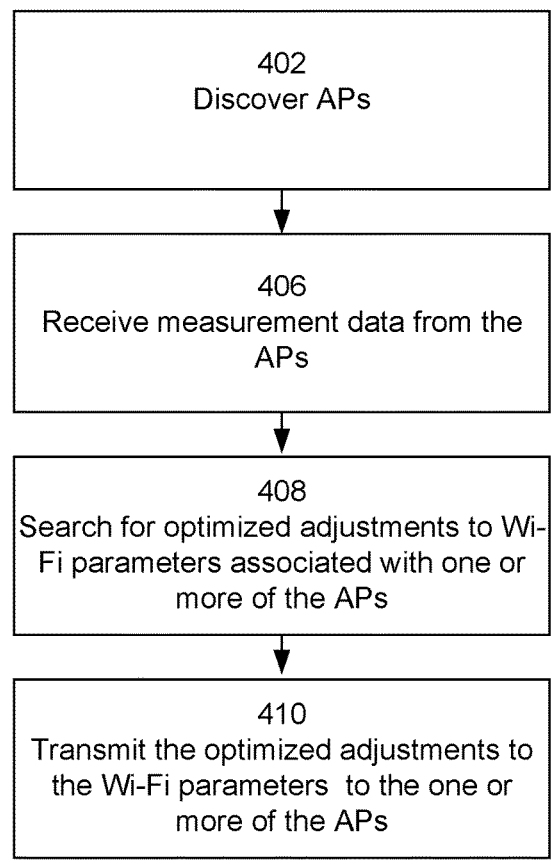
FIG. 4 is a flow chart illustrating an embodiment of a process for automatically and dynamically configuring and updating Wi-Fi AP parameters in one or more Wi-Fi networks to optimize the overall network performance.

FIG. 4 is a flow chart illustrating an embodiment of a process 400 for automatically and dynamically configuring and updating Wi-Fi AP parameters in one or more Wi-Fi networks to optimize the overall network performance. In some embodiments, process 400 is a process that runs on Wi-Fi network manager 302 in FIG. 3.

At 402, the APs that are installed in the Wi-Fi networks managed by Wi-Fi network manager 302 are discovered. Wi-Fi network manager 302 is configured to manage a heterogeneous group of APs. The APs may support different Wi-Fi protocols, including 802.11a, 802.11c, 802.11g, 802.11n, 802.11ac, and the like. The APs can be made by different third-party vendors. Some of the APs may be purchased off-the-shelf. Therefore, the APs that are managed by Wi-Fi network manager 302 have a wide range of capabilities, configurable parameters, and interfaces. Wi-Fi network manager 302 discovers the APs within the Wi-Fi networks, including their capabilities, configurable parameters, interfaces, and the like. This information may be used by Wi-Fi network manager 302 to more optimally search for a set of configurable parameters for any AP managed by Wi-Fi network manager 302 to achieve improved overall network performance. For example, a search algorithm that is run by Wi-Fi network manager 302 may take into consideration that a particular parameter is not configurable on a particular AP to reduce the search complexity by either searching over a smaller set of configurable parameters or simplifying the search based on a partition of the APs based on their configurability.

At 406, measurement data is received from the APs. The measurement data is locally collected by the APs and then sent to Wi-Fi network manager 302. The measurement data collected by an AP may include data regarding the AP's clients and data regarding clients connected to neighboring APs. The measurement data may include receive signal strength indication (RSSI), channel quality index (CQI), throughput, packet error rate, and the like. RSSI is a measurement of the power present in a received radio signal. CQI is a measurement of the communication quality of wireless channels. In some embodiments, the measurement data is Wi-Fi standard-based measurement data (e.g., 802.11 standard-based measurement data) measured by the APs. In some embodiments, the APs may collect additional measurement data that is optional or not specified in the 802.11 standards.

At 408, adjustments to Wi-Fi parameters associated with one or more APs to optimize the Wi-Fi overall network performance are searched. As Wi-Fi network manager 302 receives measurement data from many APs, including APs installed in multiple Wi-Fi networks, the measurement data may be used by Wi-Fi network manager 302 to compute Wi-Fi parameters that can optimize network performance in a global sense, achieving superior network performance.

The Wi-Fi overall network performance may be defined by different metrics. In some embodiments, the metrics may be a set of network optimization goals defined by a network operator. The goals may include increasing the average network throughput, increasing the geometric mean throughput, reducing interference, reducing outage probability, increasing coverage, improving fairness, supporting specific quality-of-service metrics for high-priority traffic, and the like.

Different Wi-Fi parameters may be dynamically adjusted to optimize the Wi-Fi overall network performance. As will be described in greater detail below, Wi-Fi parameters that can be dynamically and optimally adjusted may include CSTs, channel allocation, transmit power, multiple-input multiple-output (MIMO) antenna parameters, backoff parameters, and the like.

Different optimization techniques may be employed by Wi-Fi network manager 302 for searching the optimized Wi-Fi parameters. In some embodiments, the network optimization goals are evaluated based at least in part on the measurement data received from the APs. For example, an aggregate network throughput may be computed based on throughput measurement data received from the APs. The set of network optimization goals may be represented by an objective function or a cost function in an optimization problem. An optimized Wi-Fi parameter resulting from the search is a feasible solution or optimal solution that minimizes (or maximizes) the objective function subject to different constraints. Since multiple types of Wi-Fi parameters may be adjusted simultaneously during a search, different techniques to combat interference, increase throughput, or maximize coverage may be leveraged at the same time. For example, instead of determining channel allocation and CST individually or locally, they can be optimized simultaneously in a global sense. Some constraints may be requirement constraints that are configurable by the network operator. For example, one requirement constraint may impose a minimum percentage of AP clients in the Wi-Fi networks with a throughput above a certain threshold.

With continued reference to FIG. 4, at 410, at least some of the optimized adjustments to the one or more Wi-Fi parameters are transmitted to the one or more APs. The received adjustments may be used by the APs for self-configuration, self-optimization, and self-healing, such that the APs can collectively form a self-organizing network.

The received adjustments may be used to initialize an AP that has been recently installed. For example, after an AP is first installed, the AP collects initial measurement data and sends the data to Wi-Fi network manager 302. Wi-Fi network manager 302 then computes the parameters for AP and sends them to the AP for self-configuration.

The received adjustments may be used to re-configure an existing AP. When the existing AP connects to Wi-Fi network manager 302 for the first time, the existing AP is treated as a new installation for the purpose of network optimization. Wi-Fi network manager 302 computes new parameters for the existing AP based on the received measurement data from the existing AP and other APs, and Wi-Fi network manager 302 sends the new parameters to the existing AP for reconfiguration.

The received adjustments may also be used to periodically update the Wi-Fi parameters of an existing AP. These adjustments are computed based on dynamic, real-time measurements made periodically by the APs.

The received adjustments may also be used by the APs for self-healing any network topology changes. For example, a network topology change may be caused by the failure of an AP. Wi-Fi network manager 302 detects the failure, and the parameters of the surrounding APs are automatically adjusted to fill in the resulting coverage hole. In another example, a network topology change may be caused by new APs being installed on a Wi-Fi network. The network topology change may be detected by Wi-Fi network manager 302, which is triggered by the detection to initiate a new search.

Figure 5:
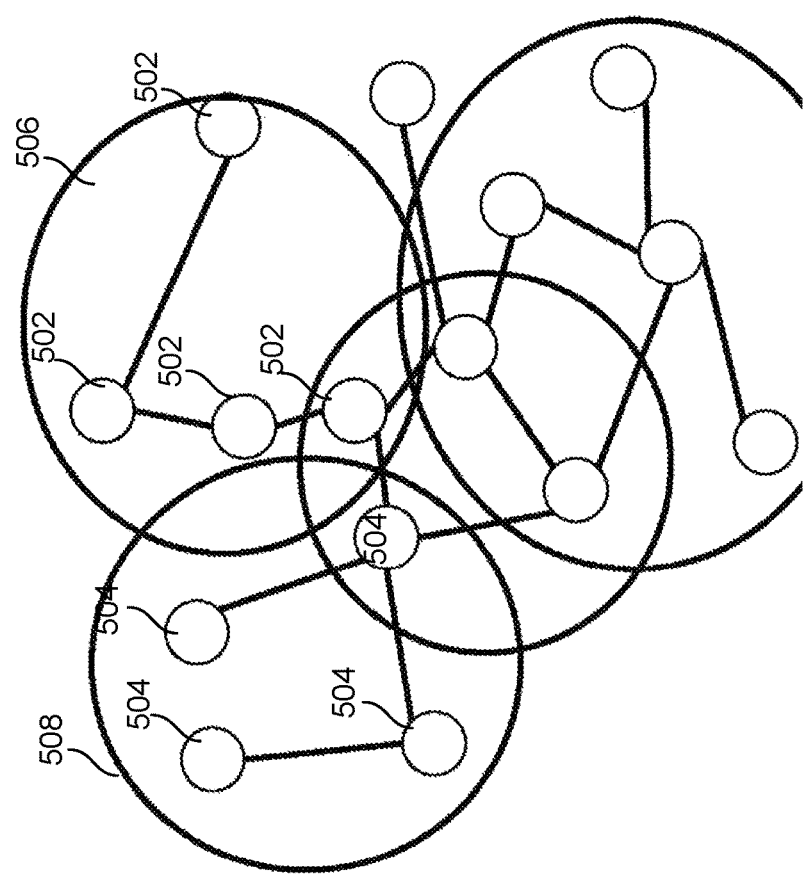
FIG. 5 illustrates that APs may be divided into a plurality of local neighborhoods for local optimization.

In some embodiments, the search performed by Wi-Fi network manager 302 may create local neighborhoods for local optimization in addition to global optimization. FIG. 5 illustrates that APs may be divided into a plurality of local neighborhoods for local optimization. As shown in FIG. 5, APs 502 within a localized region 506 are grouped together for local optimization. Similarly, APs 504 within another localized region 508 are grouped together for local optimization. A local optimization may be performed prior to a global optimization across the entire network. The local optimization has a lower computational complexity, and it avoids changing parameters across the entire network at the same time. The global optimization avoids local minima that may arise when only local parameters within a neighborhood are accounted for in the local optimization.

Figure 6:
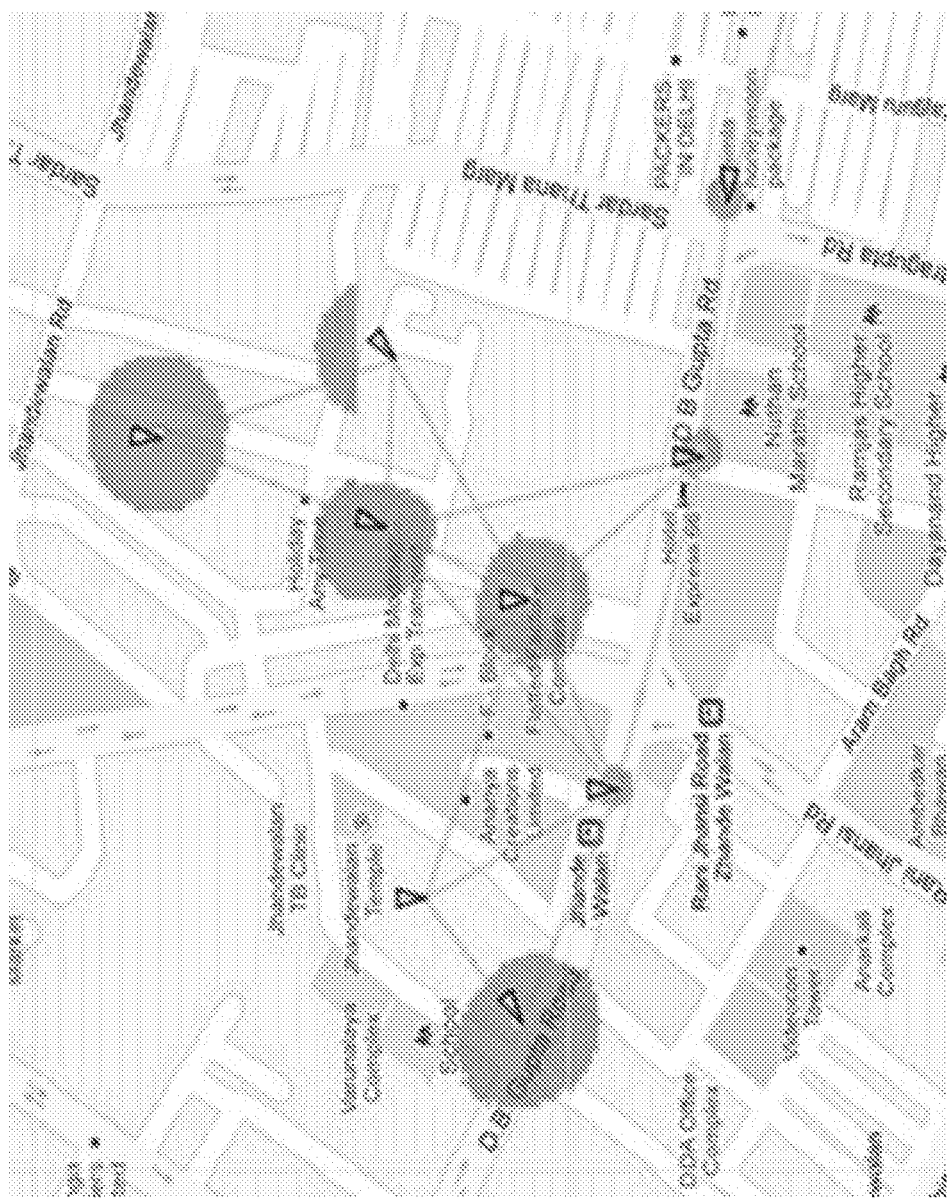
FIG. 6 illustrates that throughput maps can be provided to show the throughput available at different locations throughout the Wi-Fi network.

The AP coordination enabled by Wi-Fi network manager 302 provides additional functionality beyond the optimization of AP configuration, including load balancing, power control, coordinated scheduling, cross-layer optimization, seamless handovers, and the like. Wi-Fi network manager 302 can perform load balancing by moving a client connected to a heavily congested AP to a nearby AP that is less congested. Wi-Fi network manager 302 can also enable seamless session handoff between APs, such that mobile users experience no disruption in a streaming application, such as video. Wi-Fi network manager 302 can provide throughput maps showing the throughput available at different locations throughout the Wi-Fi network, as shown in FIG. 6. These maps are generated based on throughput calculations taking into account the RSSI and interference estimates, the measured throughputs of clients and their estimated locations, and the measured noise floor at each AP. Throughput maps identify coverage holes in the network. Moreover, they can also be used to optimize new AP deployments by determining which of several possible locations provides the largest improvement in network throughput and coverage.

Wi-Fi APs operate in the 2.4 GHz and 5 GHz bands. These bands have three and thirteen non-overlapping channels of 20 MHz, respectively. The 802.11a/g standard allows only one 20 MHz channel to be assigned to an AP and its clients, while the 802.11n and 802.11ac standards allow up to two 20 MHz and up to four 40 MHz channels, respectively, to be assigned to each AP. When more than one channel is assigned to an AP, there is the notion of a primary channel and secondary channels. The primary channel is used by an AP to communicate with devices that are restricted to the bandwidth associated with the channel. The secondary channels are used by an AP to communicate with devices that support bandwidths larger than that of the primary channel. For example, in 802.11n, two 20 MHz channels, a primary and a secondary channel, are bonded together to form a 40 MHz channel, but only the primary channel is used for communication with 802.11a/g devices as the latter only support 20 MHz channels. All packet transmissions between an AP and its clients occur either over only the primary channel or over the primary channel as well as one or more secondary channels. The AP generally prioritizes the use of its primary channel in its transmissions. Conversely, the secondary channels can only be used if the interference caused by the AP on this channel is below the CST of neighboring APs on their primary channel. Channel assignment in 802.11 entails assigning each AP a primary channel and one or more secondary channels.

The primary and secondary channel assignments are examples of Wi-Fi AP parameters that can be adjusted dynamically and automatically to optimize the overall network performance based on a set of network optimization goals. The primary and secondary channel assignments are chosen, optimally or sub-optimally, based on the set of network optimization goals. The primary and secondary channel assignments and other types of Wi-Fi parameters may be adjusted simultaneously during a search. However, in some cases, an optimal adjustment may not be available, and Wi-Fi network manager 302 optimizes the APs' channel assignment as follows:

1. Each AP is typically assigned the maximum bandwidth it can support: 20 MHz for 802.11a/g APs, 40 MHz for 802.11n APs, and 160 MHz for 802.11ac APs. This increases the likelihood that the clients associated with each AP can be served at the highest data rates possible. In some cases, assigning the maximum bandwidth that the AP can support is not the optimum solution in increasing network performance; in such cases, a smaller bandwidth is assigned to that AP.

2. The primary channel assignment scheme is such that the closest APs are assigned non-overlapping primary channels. This minimizes contention when all the APs use only primary channels.

3. Secondary channels (if applicable) are assigned to the APs to minimize interference on the primary channels.

4. Channels are assigned to minimize interference from APs not under the control of Wi-Fi network manager 302.

5. Channel assignments are periodically re-optimized as the load in each basic service set (BSS) and the associations of clients to a BSS (e.g., due to mobility or load balancing) change over time.

Figure 7:
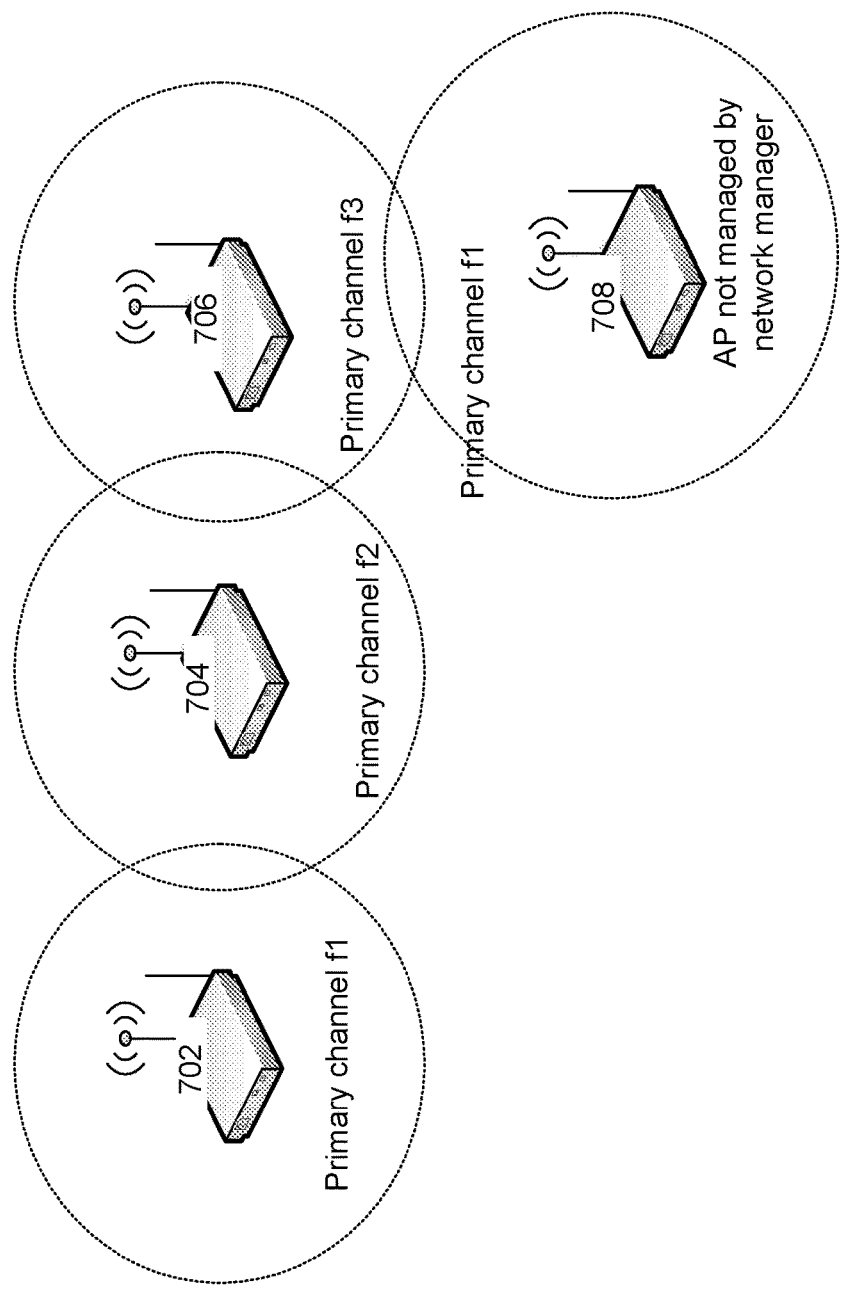
FIG. 7 illustrates an embodiment in which primary channels are assigned such that APs with their primary channels on the same frequency channel are farthest apart.

In some embodiments, Wi-Fi network manager 302 optimizes the assignment of primary channels of APs such that APs with their primary channels on the same frequency channel, whether controlled by Wi-Fi network manager 302 or not, are farthest apart. FIG. 7 illustrates an embodiment in which primary channels are assigned such that APs with their primary channels on the same frequency channel are farthest apart. APs 702, 704, and 706 are managed by Wi-Fi network manager 302, while AP 708 is not. The primary channels for AP 702, AP 704, and AP 706 are assigned different frequency channels, whereas the primary channel of AP 708 is assigned the same frequency channel as the AP farthest away, i.e., the primary channel of AP 702. In some embodiments, simple models for interference are used for optimizing the assignment of the primary channels as described above. In some embodiments, low-complexity computational techniques for approximately solving a combinatorial optimization problem are used for optimizing the assignment of the primary channels as described above. These techniques include belief propagation, convex optimization, and genetic mutation.

Figure 8:
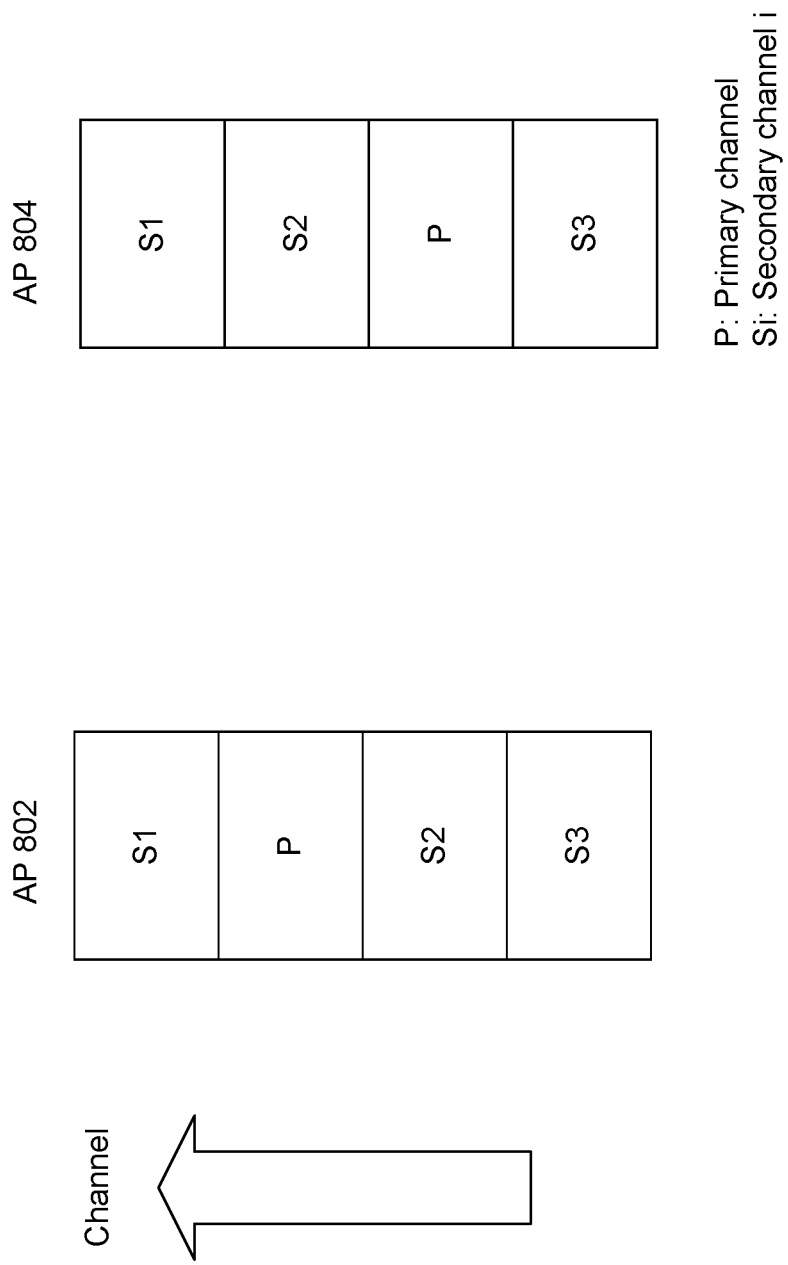
FIG. 8 illustrates that neighboring APs have non-overlapping primary channels (denoted by P), while the secondary channel S2 of each AP overlaps with the primary channel of the other AP.

Given the assignment of primary channels, secondary channels (if applicable) are assigned to the APs to minimize interference on primary channels. However, since the number of channels available is limited and Wi-Fi network manager 302 first assigns the maximum bandwidth to each AP, an AP's primary channel may overlap with a neighboring AP's secondary channels, as shown in FIG. 8. As indicated in FIG. 8, neighboring APs have non-overlapping primary channels (denoted by P), while the secondary channel S2 of each AP overlaps with the primary channel of the other AP. In addition, secondary channel S1 (or S3) of AP 802 overlaps with secondary channel S1 (or S3) of AP 804. Based on the 802.11 standard, AP 802 can transmit at its maximum power on its primary channel, and will often do so to clients located on the edge of its coverage area. Without dynamic configuration of the CST (i.e., if the CST is set statically), the CST is typically set at a level such that AP 804 cannot reuse this channel (which is a secondary channel for AP 804) for transmission when AP 802 transmits at maximum power. For clients well in the interior of its coverage region, AP 802 will typically transmit at a lower power on its primary channel and one or more of its secondary channels. If the CST is set statically, it is typically set at a level such that AP 804 can reuse these channels when AP 802 transmits at this lower power level. Thus, this results in fractional frequency reuse. As will be described in greater detail below, dynamic adaptation of the CST and dynamic adaptation of power can provide additional degrees of freedom for optimization, resulting in further improved performance.

The transmit power levels of the APs are examples of Wi-Fi AP parameters that can be adjusted dynamically and automatically to optimize the overall network performance based on a set of network optimization goals. Wi-Fi network manager 302 also tunes the individual transmit power at APs based on their radio measurements. The transmit power at each AP is selected, optimally or sub-optimally, based on the network optimization goals. For example, reducing transmit power at a given AP reduces interference between the given AP and other devices on the same channel. However, this also reduces SNR and RSSI between the AP and its connected devices. Thus, power control optimizes this tradeoff. As another example, CST values can be taken into account while setting the transmit power of an AP. In particular, the transmit power of a given AP can be set such that neighboring APs only back off when their interference to at least one client of the given AP is above a given threshold. This form of power control is especially useful when an AP is serving clients experiencing relatively good channel quality, and hence interference from neighboring APs would not create significant degradation. In addition, Wi-Fi network manager 302 detects coverage holes via the RF coverage maps as discussed below. Upon detection of a coverage hole, Wi-Fi network manager 302 increases the transmit power of APs in the vicinity of the coverage hole up to the maximum level to fill in the hole. As another example, transmit power control can be jointly optimized with primary and secondary channel allocation to improve the network optimization.

In some embodiments, Wi-Fi network manager 302 dynamically adapts the CSTs of the APs. In dense Wi-Fi deployments, if the CST is low, the coverage area of the AP is typically much smaller than its carrier sense radius. As a result, an AP would sense the medium and avoid transmitting to its client, even when the client is far from the interfering AP (e.g., see Client 223 of FIG. 2B) and is thus capable of receiving the transmission from the AP. On the other hand, if the CST is high, a number of transmitters access the same channel simultaneously, creating higher interference, as shown in FIG. 2A. Therefore, the CST value on APs should be set dynamically based on client locations, propagation conditions, load, and network topology.

In some embodiments, Wi-Fi network manager 302 dynamically adjusts the CST to systematically create periods of high reuse and low reuse. During the high reuse periods, the CST is high, so neighboring APs on the same channel will typically transmit packets simultaneously, leading to high data rates but potentially higher packet loss due to interference. Conversely, during periods of low reuse, neighboring APs transmit at different times in order to protect the weaker links, thereby preventing their outage. This can be achieved by using different CST values during different periods. Specifically, high CST values are used during high reuse periods, while low CST values are used during low reuse periods. The CST values and the division of time between the high and low reuse phases are optimized based on the channel and load measurements. In some embodiments, larger channel bandwidths are assigned to the APs to provide more flexibility to the neighboring APs in reusing the channel in time.

Figure 9:
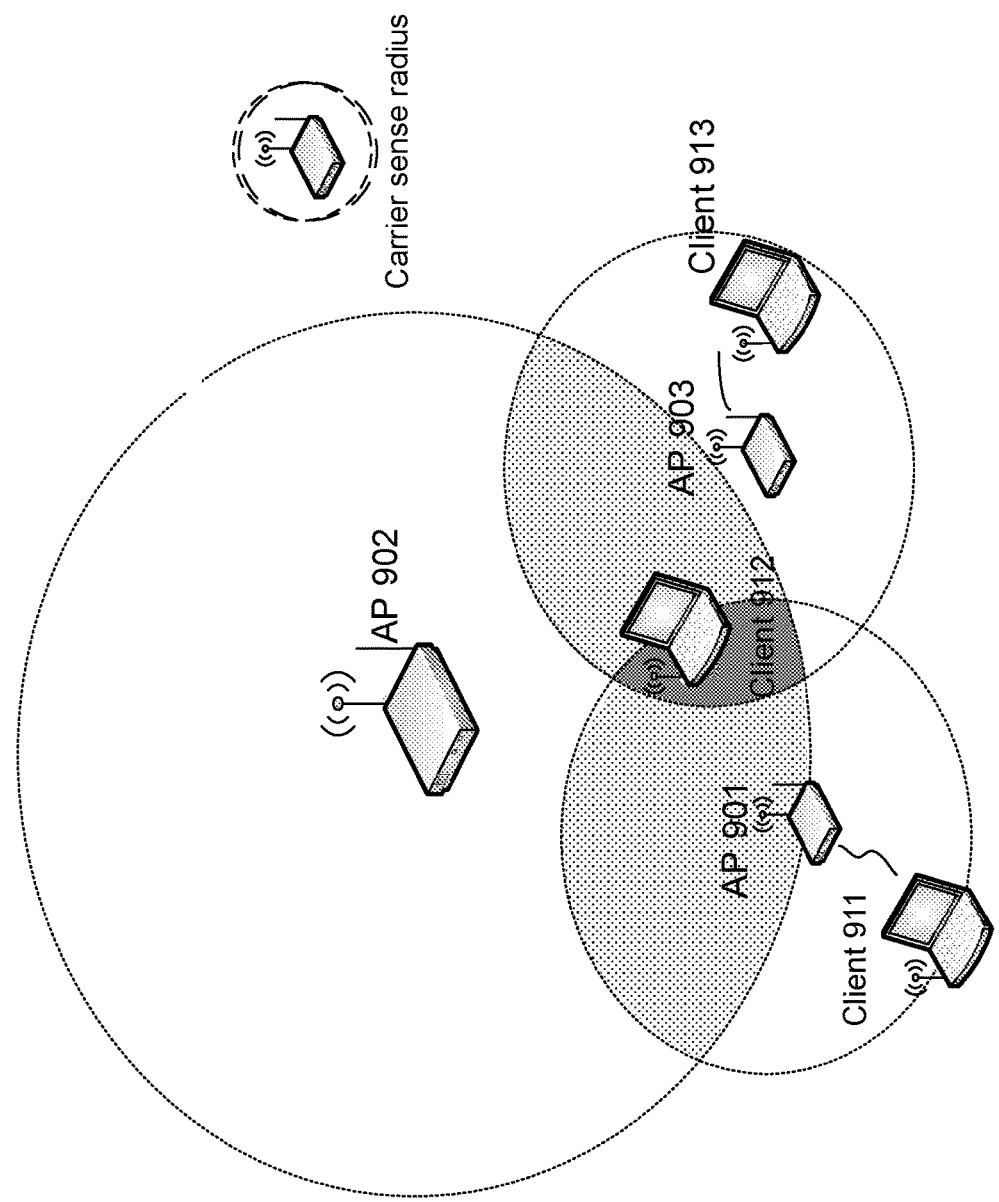
FIG. 9 illustrates the time intervals in which AP 902 is configured with a low CST while AP 901 and AP 903 are configured with high CST values.
Figure 10:
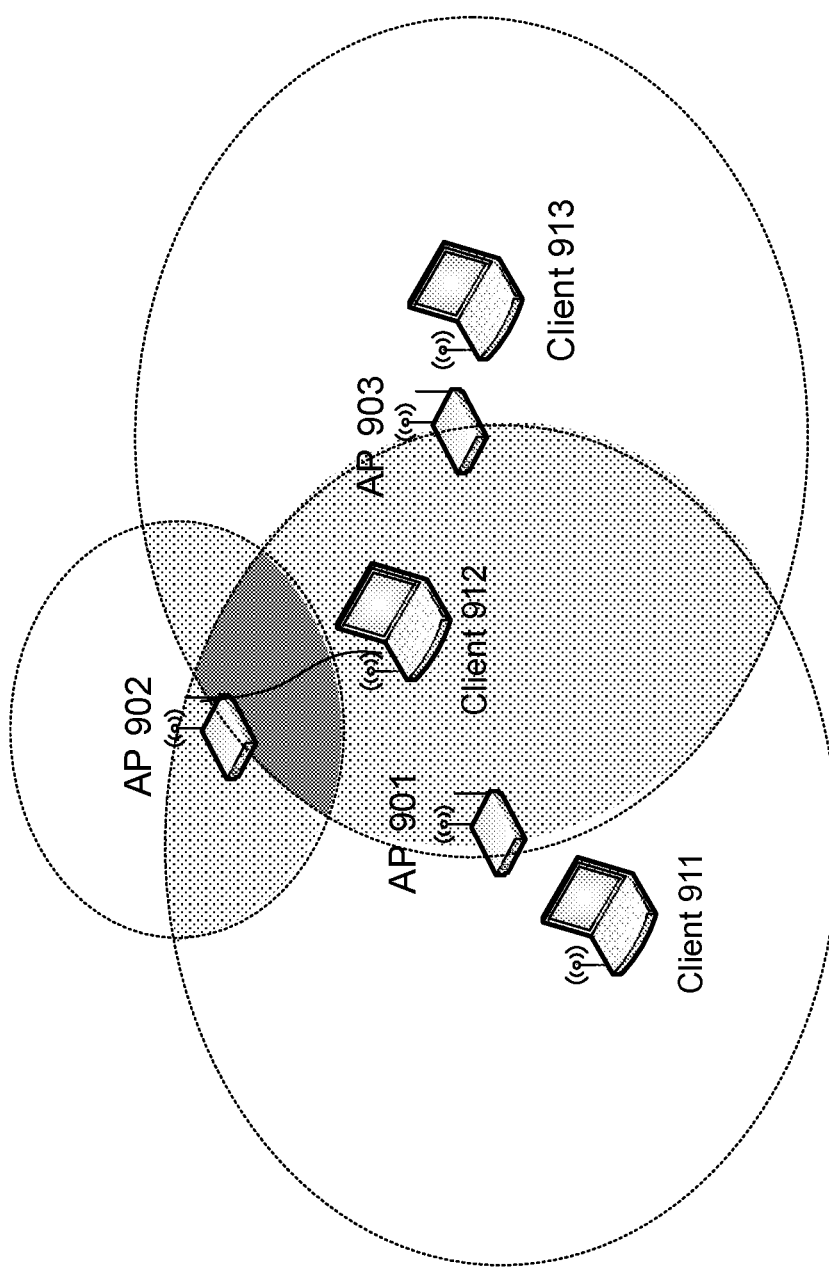
FIG. 10 illustrates that AP 902 is configured with a high CST, while AP 901 and AP 903 are configured with low CST values.

FIG. 9 and FIG. 10 illustrate the high and low reuse periods of APs assigned to the same channel. FIG. 9 shows time intervals in which AP 902 is configured with a low CST while AP 901 and AP 903 are configured with high CST values. During such intervals, AP 902 remains silent, whereas AP 901 and AP 903 transmit to client 911 and client 913 simultaneously. This ensures that the network obtains high frequency reuse (increased overall throughput) without outages over individual links.

While the CST settings of FIG. 9 provide aggressive reuse for AP 901 and AP 903, AP 902 is precluded from transmitting. Thus, during other time intervals, as shown in FIG. 10, the dynamic CST would configure AP 902 with a high CST, while AP 901 and AP 903 are configured with low CST values. During such intervals, when AP 902 transmits to client 912, AP 901 and AP 903 backs off from transmitting (upon sensing AP 902's transmissions), thereby ensuring client 912 is protected from the potential interference. This ensures that the network can guarantee that all clients obtain satisfactory user experience. This dynamic CST optimization scheme may be coupled with dynamic channel assignment (discussed earlier) to jointly optimize the channel allocation and frequency reuse for each channel. This dynamic CST optimization scheme may be coupled with dynamic channel allocation (discussed earlier) to jointly optimize channel allocation and transmit power for each channel. Dynamic CST, power control, and channel allocation may also be jointly optimized.

In some embodiments, Wi-Fi network manager 302 dynamically optimizes the MIMO parameters of the APs. By introducing standards-based support for multiple antennas, the 802.11n and 802.11ac standards provide additional spatial dimensions for optimization. This flexibility allows for higher data rates and improved link reliability within the same bandwidth. In particular, compared to single antenna transmission/reception, MIMO schemes provide a three-fold advantage in terms of increased data throughput (spatial multiplexing), increased link reliability (transmit diversity), and array gain (spatial beamforming).

The 802.11n and 802.11ac standards support up to 4 and 8 transmit and receive antennas, respectively, with an equal number of maximum spatial streams. The 802.11n/ac standards provide support for achieving the aforementioned advantages via spatial precoding and beamforming schemes. The peak rate achieved in 802.11n is 600 Mbps while that in 802.11ac is more than 1 Gbps. In addition, the 802.11ac standard supports Multi-User MIMO (MU-MIMO), wherein multiple clients, each equipped with one or more antennas, can simultaneously transmit/receive within the same frequency channel.

In some embodiments, Wi-Fi network manger 302 optimizes MIMO transmission parameters as follows:

1. Transmission Selection between Spatial Multiplexing and Diversity: There is a tradeoff between maximizing the data rate (via transmitting multiple spatial streams) and providing adequate link reliability in the presence of fading and multipath propagation (via diversity) for each spatial stream. This paradigm is referred to as the Diversity-Multiplexing (DM) tradeoff. In some embodiments, Wi-Fi network manager 302 optimizes the transmission scheme, by exploiting the DM tradeoff, depending on the radio link conditions between each AP to its client.

2. Beamforming: Beamforming at the AP provides increased signal-to-noise ratio (SNR) at a client; alternatively, given knowledge of the channel statistics, the solution can minimize interference to clients connected to neighboring APs on the same channel.

3. Switching between Single-User and Multi-User MIMO: In high geometry and sufficiently uncorrelated scenarios, the solution will enable APs to spatially precode and transmit to multiple clients, provided their spatial signatures are sufficiently resolvable at the client.

Wi-Fi network manager utilizes measurements performed by the APs to measure the channels to its clients as well as clients associated with neighboring APs operating on the same frequencies. The channels are estimated on the basis of sounding packets transmitted by clients. The measurements are fed back to Wi-Fi network manager, which optimizes the MIMO parameters at the APs via standardized interfaces, as discussed above.

In some embodiments, Wi-Fi network manager 302 dynamically adapts the load balancing of the APs. Load balancing dynamically updates the association of clients based on the loads at different APs. For example, if an AP is highly loaded, Wi-Fi network manager 302 can avoid overloading this AP by a client on the boundary of the AP's coverage area to connect to a neighboring AP with a low load, even if the channel quality of the client to the neighboring AP is not as good. This load balancing can result in performance improvement for this client, as well as the other clients connected to the original AP. After offloading a client from one AP to a less-loaded AP, Wi-Fi network manager 302 then re-optimizes the channel allocations and transmit powers of the affected APs to account for this change in load.

In some embodiments, Wi-Fi network manager 302 dynamically coordinates the scheduling of the APs. Wi-Fi network manager 302 enables a backhaul-coordinated scheduling whereby the APs managed by the network manager access the medium in a contention-free manner by transmitting beacon frames and a NAV-based reservation (within the beacon frames) of the medium. This notion of centralized scheduling and beacon-based access is akin to the concept of almost-blank subframes discussed earlier. Within the contention-free period, the resource allocation (e.g., the number of transmission opportunities at individual APs) within the contention-free period can be determined by Wi-Fi network manager 302 based on different parameters, such as, for example, the queue lengths of different traffic classes at individual APs. Between time intervals with contention-free access, the dynamic configuration technique will implement periods of contention-based access in order to ensure that APs that are not managed by Wi-Fi network manager 302 can access the medium.

In some embodiments, Wi-Fi network manager 302 enables Cross-Layer Optimization for Adaptive Video Streaming. One of the key challenges in adaptive video streaming over HTTP over TCP is to adapt the video quality to the end-to-end bandwidth available between the server and the client. If a Wi-Fi network is used as the last hop to deliver streaming video to the client, the bandwidth is often limited by the wireless bandwidth available between the client and the AP it connects to. In some embodiments, application programming interfaces (APIs) are used between the media access control (MAC) layer and the application layer to achieve the following:

1. Estimates of data rates that can be offered in the future, for example on a timescale of tens of seconds, can be provided to the application layer. This can help the application layer better adapt the video quality. Current solutions can be either too aggressive or too slow to react to bandwidth variation.

2. Admission control and rate guarantees may be performed for the different video streaming flows so that the desired quality of video can be viewed by the users. User differentiation can also be provided.

In some embodiments, Wi-Fi network manger 302 enables seamless Handoffs handoffs. In Wi-Fi networks, APs with the same SSID are called an Extended Service Set—clients transparently connect to any AP in this set without differentiation. Wi-Fi network manager 302 configures the Extended Service Set (ESS) for APs within a hotspot to ensure client mobility within the service area. Existing management interfaces are used to configure APs in this set, without requiring changes to the AP's software.

Advanced handoff functionality may be supported when a software agent is integrated with the APs. Inter-AP coordination for seamless handoffs within an ESS can be provided. The software agent adds Proxy Mobile IP functionality to the AP, enabling client handover across ESSs. This is a network-initiated procedure and there is no dependency on the client.

Figure 11:
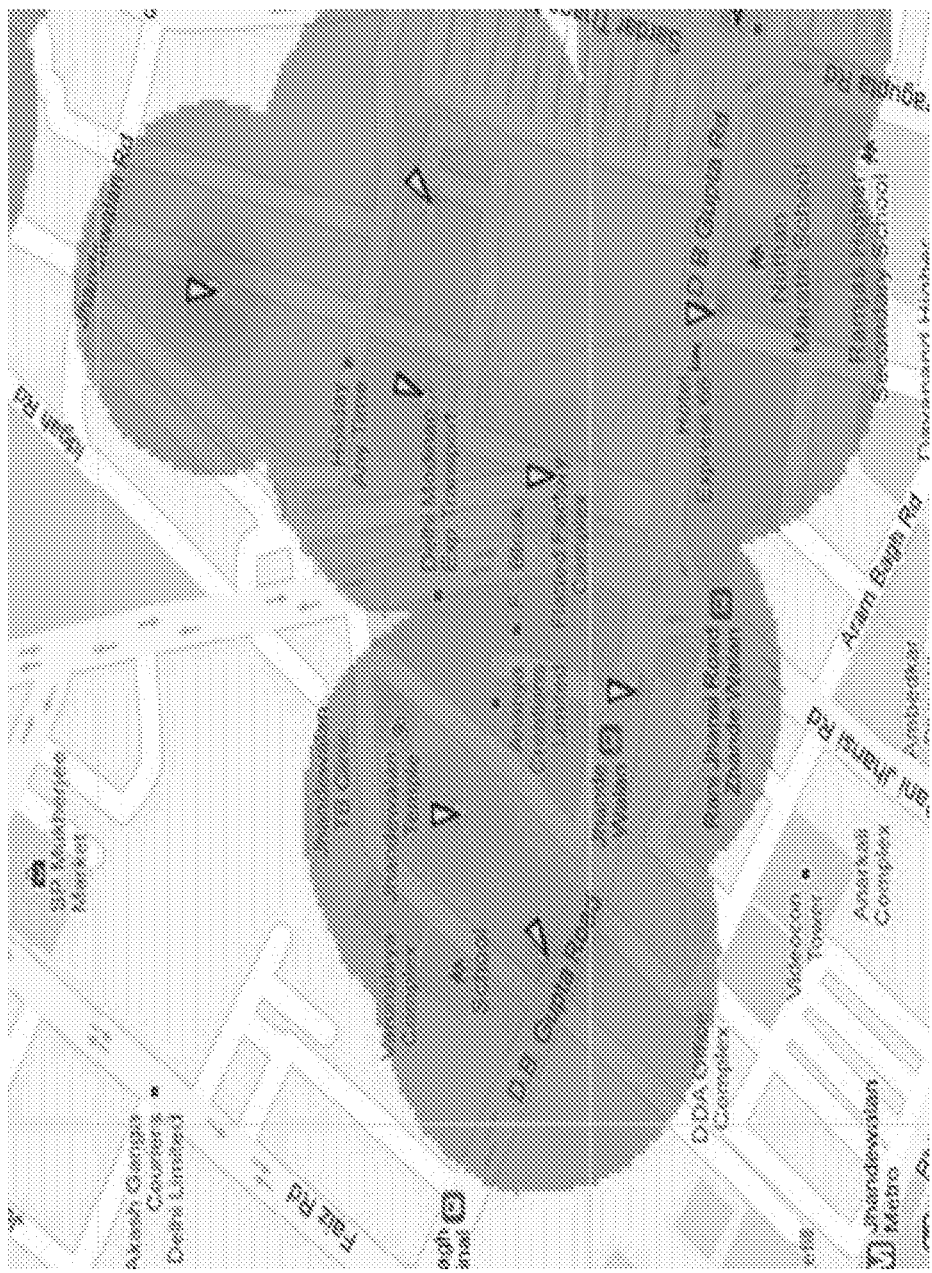
FIG. 11 illustrates an embodiment of a coverage map generated by the Wi-Fi network manager.

In some embodiments, Wi-Fi network manager 302 provides coverage maps. Note that all APs (as well as clients) constantly monitor the wireless medium and attempt to decode all ongoing transmissions. As part of the decoding process, channel estimation is performed and thus the total received power from the transmitter of the ongoing transmission is determined. Thus, an AP will typically measure the RSSI from all APs and their clients operating on the same channel, as long as the packets transmitted by them can be received at sufficient received power. By cycling through different channels periodically, the AP can measure the channel gains to neighboring APs and their clients on all channels. This information, along with channel propagation models and client location information—determined by GPS if available, or estimated via intersections of location contours based on time-difference of arrival, angle-of-arrival, or connection-trajectory estimates—are used by Wi-Fi network manager 302 to create SINR measurements at all client locations and the associated throughput and coverage maps, as illustrated in FIGS. 6 and 11.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A Wi-Fi network manager, comprising:
a control interface in communication with a plurality of Wi-Fi access points;
a processor; and
a memory storing an objective function, the objective function optimizing a set of network optimization goals defined by different metrics, wherein the memory is coupled with the processor, and wherein the memory is configured to provide the processor with instructions which when executed cause the processor to:

receive measurement data from the plurality of Wi-Fi access points having different capabilities and configurable parameters;

search for optimized simultaneous adjustments to two or more Wi-Fi parameters associated with one or more of the plurality of Wi-Fi access points that minimize or maximize the objective function based at least in part on the measurement data received from the plurality of Wi-Fi access points, wherein the search is constrained to one of i) a search only over a subset configurable parameters based on the configurable parameters of the plurality of Wi-Fi access points and ii) a simplified search based on a partition of the plurality Wi-Fi access points based on the configurable parameters; and transmit at least some of the optimized simultaneous adjustments to the two or more Wi-Fi parameters to the one or more of the plurality of Wi-Fi access points using the control interface.

2. The Wi-Fi network manager of claim 1, wherein the memory is further configured to provide the processor with instructions which when executed cause the processor to:

discover a set of configurable Wi-Fi parameters corresponding to each of the one or more of the plurality of Wi-Fi access points.

3. The Wi-Fi network manager of claim 1, wherein the plurality of Wi-Fi access points comprises a heterogeneous group of access points supporting different Wi-Fi protocols.

4. The Wi-Fi network manager of claim 1, wherein the plurality of Wi-Fi access points comprises a heterogeneous group of access points made by a plurality of third-party vendors.

5. The Wi-Fi network manager of claim 1, wherein the two or more Wi-Fi parameters comprise a parameter corresponding to a carrier sense threshold (CST) of one of the plurality of Wi-Fi access points.

6. The Wi-Fi network manager of claim 1, wherein the two or more Wi-Fi parameters comprise a parameter corresponding to channel allocation of one of the plurality of Wi-Fi access points.

7. The Wi-Fi network manager of claim 1, wherein the two or more Wi-Fi parameters comprise a parameter corresponding to power control of one of the plurality of Wi-Fi access points.

8. The Wi-Fi network manager of claim 1, wherein the two or more Wi-Fi parameters comprise a parameter corresponding to multiple-input multiple-output (MIMO) antenna.

9. The Wi-Fi network manager of claim 1, wherein the two or more Wi-Fi parameters comprise a CST parameter and a channel allocation parameter, and wherein the CST parameter and the channel allocation parameter are jointly optimized.

10. The Wi-Fi network manager of claim 1, wherein the two or more Wi-Fi parameters comprise a power control parameter and a channel allocation parameter, and wherein the power control parameter and the channel allocation parameter are jointly optimized.

11. The Wi-Fi network manager of claim 1, wherein the two or more Wi-Fi parameters comprise a CST parameter, a channel allocation parameter, and a power control parameter, and wherein the CST parameter, the channel allocation parameter, and the power control parameter are jointly optimized.

12. The Wi-Fi network manager of claim 1, wherein the measurement data comprises Wi-Fi standard-based measurement data measured by an access point.

13. The Wi-Fi network manager of claim 1, wherein the measurement data comprises one or more of the following: receive signal strength (RSS), channel quality index (CQI), throughput, and packet error rate.

14. The Wi-Fi network manager of claim 1, wherein the set of network optimization goals comprises one or more of the following: increasing the average network throughput, increasing the geometric mean throughput, reducing interference, reducing outage probability, increasing coverage, improving fairness, and supporting specific quality-of-service metrics for high-priority traffic.

15. The Wi-Fi network manager of claim 1, wherein the searching for optimized simultaneous adjustments to the two or more Wi-Fi parameters comprises evaluating the set of network optimization goals based at least in part on the measurement data.

16. The Wi-Fi network manager of claim 1, wherein the searching for optimized simultaneous adjustments to the two or more Wi-Fi parameters comprises searching subject to a set of requirement constraints configurable by a network operator.

17. The Wi-Fi network manager of claim 1, wherein the optimized simultaneous adjustments are received by an access point via a software agent installed on the access point.

18. The Wi-Fi network manager of claim 1, wherein the one or more of the plurality of Wi-Fi access points are access points in a localized region, and wherein the memory is further configured to provide the processor with instructions which when executed cause the processor to:

search for optimized simultaneous adjustments to additional Wi-Fi parameters associated with one or more of the plurality of Wi-Fi access points that are outside the localized region, wherein the search for optimized simultaneous adjustments to the additional Wi-Fi parameter is performed at a time subsequent to the search for optimized simultaneous adjustments to the two or more Wi-Fi parameters; and transmit at least some of the optimized simultaneous adjustments to the additional Wi-Fi parameters to the one or more of the plurality of Wi-Fi access points that are outside the localized region using the control interface.

19. The Wi-Fi network manager of claim 1, wherein the memory is further configured to provide the processor with instructions which when executed cause the processor to:

detect whether one of the plurality of Wi-Fi access points has failed or whether an additional access point has been installed; and initiate the search in response to the detection.

20. The Wi-Fi network manager of claim 1, wherein the memory is further configured to provide the processor with instructions which when executed cause the processor to:

dynamically adjust a distribution of Wi-Fi clients to the plurality of Wi-Fi access points based at least in part on load balancing.

21. A method of managing Wi-Fi access points by a Wi-Fi network manager, comprising:

receiving by the Wi-Fi network manager measurement data from a plurality of Wi-Fi access points via a control interface, wherein the plurality of Wi-Fi access points have different capabilities and configurable parameters;

searching, using a processor, for optimized simultaneous adjustments to two or more Wi-Fi parameters associated with one or more of the plurality of Wi-Fi access points that minimize or maximize an objective function based at least in part on the measurement data received from the plurality of Wi-Fi access points, wherein the objective function optimizes a set of network optimization goals defined by different metrics, wherein the searching is constrained to one of i) a search only over a subset configurable parameters based on the configurable parameters of the plurality of Wi-Fi access points and ii) a simplified search based on a partition of the plurality Wi-Fi access points based on the configurable parameters; and transmitting at least some of the optimized simultaneous adjustments to the two or more Wi-Fi parameters to the one or more of the plurality of Wi-Fi access points using the control interface.

22. The method of claim 21, further comprising:
discovering a set of configurable Wi-Fi parameters corresponding to each of the one or more of the plurality of Wi-Fi access points.

23. The method of claim 21, wherein the plurality of Wi-Fi access points comprises a heterogeneous group of access points supporting different Wi-Fi protocols.

24. The method of claim 21, wherein the plurality of Wi-Fi access points comprises a heterogeneous group of access points made by a plurality of third-party vendors.

25. The method of claim 21, wherein the two or more Wi-Fi parameters comprise a parameter corresponding to a carrier sense threshold (CST) of one of the plurality of Wi-Fi access points.

26. The method of claim 21, wherein the two or more Wi-Fi parameters comprise a parameter corresponding to channel allocation of one of the plurality of Wi-Fi access points.

27. The method of claim 21, wherein the two or more Wi-Fi parameters comprises a parameter corresponding to power control of one of the plurality of Wi-Fi access points.

28. The method of claim 21, wherein the two or more Wi-Fi parameters comprise a parameter corresponding to multiple-input multiple-output (MIMO) antenna.

29. The method of claim 21, wherein the two or more Wi-Fi parameters comprise a CST parameter and a channel allocation parameter, and wherein the CST parameter and the channel allocation parameter are jointly optimized.

30. The method of claim 21, wherein the two or more Wi-Fi parameters comprise a power control parameter and a channel allocation parameter, and wherein the power control parameter and the channel allocation parameter are jointly optimized.

31. The method of claim 21, wherein the two or more Wi-Fi parameters comprise a CST parameter, a channel allocation parameter, and a power control parameter, and wherein the CST parameter, the channel allocation parameter, and the power control parameter are jointly optimized.

32. The method of claim 21, wherein the measurement data comprises Wi-Fi standard-based measurement data measured by an access point.

33. The method of claim 21, wherein the measurement data comprises one or more of the following: receive signal strength (RSS), channel quality index (CQI), throughput, and packet error rate.

34. The method of claim 21, wherein the set of network optimization goals comprises one or more of the following: increasing the average network throughput, increasing the geometric mean throughput, reducing interference, reducing outage probability, increasing coverage, improving fairness, and supporting specific quality-of-service metrics for high-priority traffic.

35. The method of claim 21, wherein the searching for optimized simultaneous adjustments to the two or more Wi-Fi parameters comprises evaluating the set of network optimization goals based at least in part on the measurement data.

36. The method of claim 21, wherein the searching for optimized simultaneous adjustments to the two or more Wi-Fi parameters comprises searching subject to a set of requirement constraints configurable by a network operator.

37. The method of claim 21, wherein the optimized simultaneous adjustments are received by an access point via a software agent installed on the access point.

38. The method of claim 21, wherein the one or more of the plurality of Wi-Fi access points are access points in a localized region, and wherein the method further comprises:
searching for optimized simultaneous adjustments to additional Wi-Fi parameters associated with one or more of the plurality of Wi-Fi access points that are outside the localized region, wherein the search for optimized simultaneous adjustments to the additional Wi-Fi parameter is performed at a time subsequent to the search for optimized simultaneous adjustments to the two or more Wi-Fi parameters; and transmitting at least some of the optimized simultaneous adjustments to the additional Wi-Fi parameters to the one or more of the plurality of Wi-Fi access points that are outside the localized region using the control interface.

39. The method of claim 21, further comprising:
detecting whether one of the plurality of Wi-Fi access points has failed or whether an additional access point has been installed; and
initiating the search in response to the detection.

40. The method of claim 21, further comprising:
dynamically adjusting a distribution of Wi-Fi clients to the plurality of Wi-Fi access points based at least in part on load balancing.

41. A computer program product for managing Wi-Fi access points by a Wi-Fi network manager, the computer program product being embodied in a non-transitory computer readable storage medium and comprising computer instructions for:
receiving measurement data from a plurality of Wi-Fi access points, wherein the plurality of Wi-Fi access points have different capabilities and configurable parameters;
searching for optimized simultaneous adjustments to two or more Wi-Fi parameters associated with one or more of the plurality of access points that minimize or maximize an objective function based at least in part on the measurement data received from the plurality of Wi-Fi access points, wherein the objective function optimizes a set of network optimization goals defined by different metrics, wherein the searching is constrained to one of i) a search only over a subset configurable parameters based on the configurable parameters of the plurality of access points and ii) a simplified search based on a partition of the plurality Wi-Fi access points based on the configurable parameters; and
transmitting at least some of the optimized simultaneous adjustments to the two or more Wi-Fi parameters to the one or more of the plurality of Wi-Fi access points.

* * * * *